United States Patent [19]

Erlichman et al.

[11] 4,130,357
[45] Dec. 19, 1978

[54] FLEXIBLE SHUTTER FOR PHOTOGRAPHIC CAMERA

[75] Inventors: Irving Erlichman, Wayland; William T. Plummer, Concord, both of Mass.

[73] Assignee: Polaroid Corporation, Cambridge, Mass.

[21] Appl. No.: 816,486

[22] Filed: Jul. 18, 1977

[51] Int. Cl.² ........................... G03B 9/28; G03B 9/40
[52] U.S. Cl. .................................... 354/241; 354/246
[58] Field of Search ............... 354/241, 242, 245, 249, 354/226, 187, 202, 296, 195, 25, 236

[56] References Cited

U.S. PATENT DOCUMENTS

| 429,792 | 6/1890 | Moessard | 354/236 X |
|---|---|---|---|
| 3,087,400 | 4/1963 | Brandt | 354/187 |
| 3,185,060 | 5/1965 | Borghesani | 354/187 |
| 3,412,662 | 11/1968 | Balalis | 354/202 |
| 3,882,522 | 5/1975 | Erlichman | 354/247 X |
| 3,902,792 | 9/1975 | Plummer | 354/296 X |
| 3,918,077 | 11/1975 | Burton et al. | 354/248 X |
| 3,952,317 | 4/1976 | Galbraith | 354/246 X |

FOREIGN PATENT DOCUMENTS 1155978  7/1961  Fed. Rep. of Germany ........... 354/246

*Primary Examiner*—Donald A. Griffin
*Attorney, Agent, or Firm*—Frank J. Caufield

[57] ABSTRACT

A photograhic camera is provided with a simple flexible shutter that is configured to bow in response to the axial focusing movement of the camera's lens in order to maintain a fixed shutter-to-lens distance as the camera's lens is focused.

11 Claims, 5 Drawing Figures

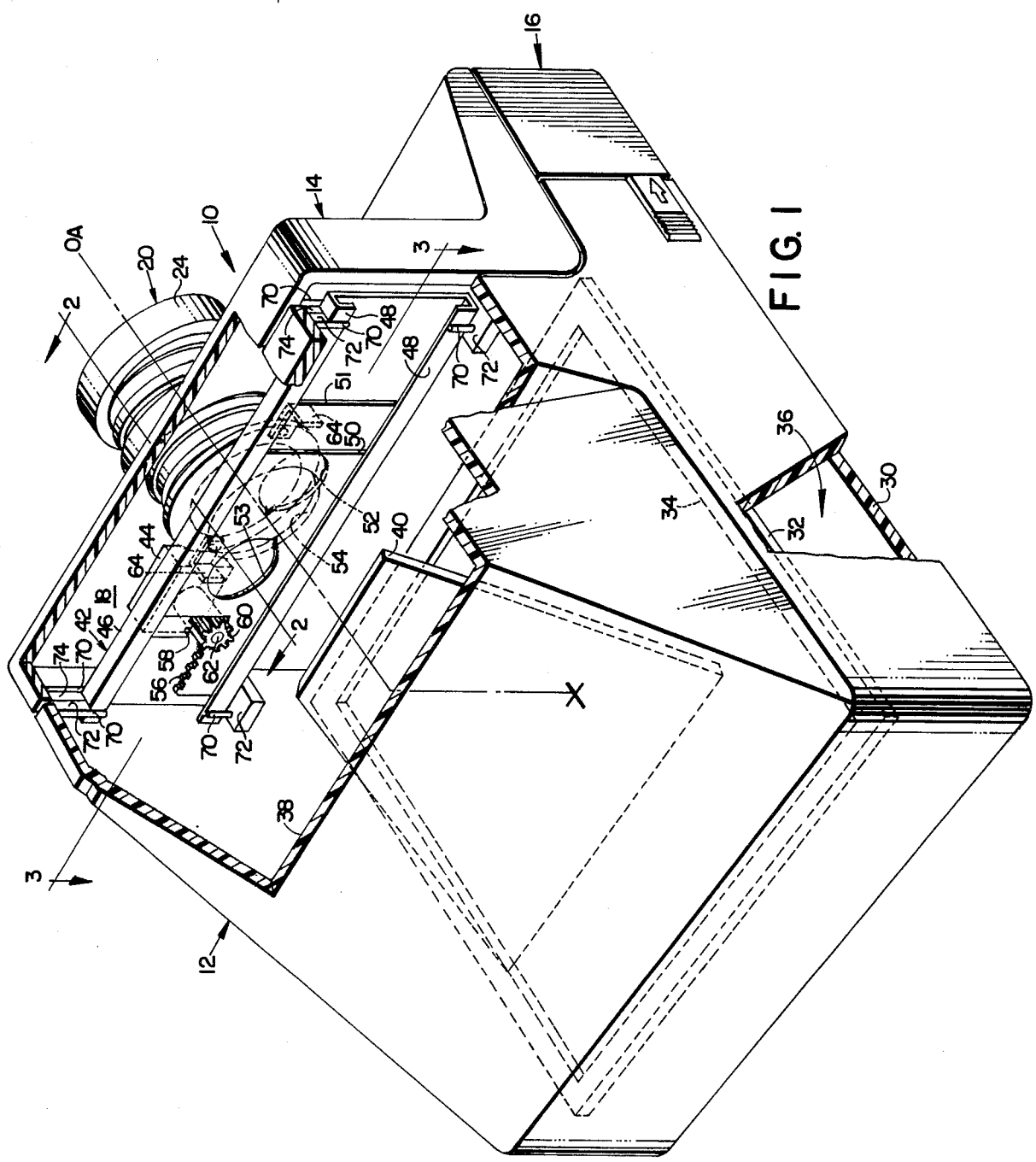

FLEXIBLE SHUTTER FOR PHOTOGRAPHIC CAMERA

BACKGROUND OF THE INVENTION

1. Field of the Invention

This invention relates to photographic camera apparatus, and, more particularly, to the structural configuration of a thin, normally flat, flexible shutter which may be bowed to follow the lens of a simple type camera in a predetermined manner as the lens is adjusted for focus.

2. Description of the Prior Art

Simple lenses having fixed focal lengths, such as the classical single element meniscus landscape lens, have often been used in box or rigid body type cameras because they are inexpensive, easy to manufacture, and are perfectly satisfactory for many photographic applications, particularly those of the amateur photographer. However, in order to obtain sharply imaged photographs with cameras utilizing these simple lenses, it is generally necessary to provide some means for changing the actual distance between the lens and the film in accordance with the distance separating the lens from the object it is to image. Adjusting the lens to film distance is, of course, known as focusing, and the amount of focusing required is related to the focal length of the particular lens being used and the object distance.

There are several well known ways of changing the focus distance. For example, one popular way is to provide a helical focusing mount in which the lens can be rotated to screw it towards or away from the film. Another involves the use of a rack and pinion arrangement where the rack is attached along the length of a cylindrical tube in which the lens is mounted and the pinion is mounted with the camera housing and engaged with the rack. The photographer, in this case, simply rotates the pinion through some suitable means to move the cylindrical mount and lens as a unit toward or away from the film.

Another way of focusing is disclosed in U.S. Pat. No. 3,902,792 issued to William T. Plummer on Sept. 2, 1975 and entitled "Landscape Lens" where the patentee describes an improved landscape lens which is mounted in a cylindrical sleeve which may be slid in a camera housing between two detent positions that are separated from the film plane by different amounts corresponding to a short back focal length for objects which are far and a longer back focal length for nearer objects.

The foregoing focusing arrangements are quite effective when used in combination with the simple type lens and are attractive from an economic standpoint because of their simplicity. However, there are problems associated with these focusing arrangements when used with simple lenses of the fixed focus type.

One of those problems is related to the fact that aperture stops often play an important role in the quality of the image formed by a simple lens. As an example consider the familiar landscape lens again. This consists of a simple positive meniscus lens element and an aperture stop. In this lens the aperture stop is used to minimize the coma aberration. Moreover, it is also well known that there is an optimum location on the concave side of a meniscus lens element for the purpose of reducing coma and that the allowable tolerance by which the aperture stop may deviate from the optimum location is very small especially compared with the distance by which such a lens would have to travel with respect to the film for proper focus over some reasonable range of object distances, say, 3.0 meters to ∞. All this means is that the spatial relationship between the aperture stop and the meniscus lens element must be maintained substantially constant as such a lens is focused. Normally this presents no problem since the meniscus lens element and the aperture stop can be moved as a unit. However, when a shutter is introduced, the situation becomes more complicated because the aperture associated with the shutter may interfere with the coma correcting stop's function or actually take over its function if proper precautions are not exercised.

There are two known ways of solving this problem. The first is to provide a stationary shutter whose aperture is sufficiently large so that it never becomes part of the optical system or interferes with the coma correcting stop. In this manner, the lens may be focused with no degradation in image quality, but the shutter must, in general, be relatively large and probably relatively expensive as, for example, a focal plane type.

The second solution involves moving the entire shutter assembly with the lens to maintain some fixed shutter-to-lens distance as the lens is focused. This is a well known approach used in folding type cameras with accordian type bellows having erecting systems as those shown, for example, in U.S. Pat. No. 3,185,060 issued to R. S. Borghesani on May 25, 1965 and entitled "Photographic Apparatus" and U.S. Pat. No. 3,087,400 issued to E. R. Brandt on Apr. 30, 1963 and entitled "Folding Camera." It is also the approach suggested for use in a rigid body type camera such as that shown in FIG. 1 of previously referenced U.S. Pat. No. 3,902,792 issued to W. T. Plummer.

This second way, while satisfactory for folding type cameras having movable erecting systems, is not considered satisfactory for rigid body type cameras or folding cameras which erect into a fixed stationary configuration because it adds to camera size and requires that the entire shutter mechanism be moved in concert with the lens.

Consequently, there is a need for a simple compact shutter for tracking the focusing movement of a lens.

It is therefore a primary object of this invention to provide a simple compact shutter for tracking the focusing movement of a lens by flexing the shutter blade elements.

Other objects of this invention will in part be obvious and will in part appear hereinafter. The invention accordingly comprises the apparatus possessing the construction, combination of elements and arrangement of parts which are exemplified in the following detailed description.

SUMMARY OF THE INVENTION

This invention relates to a photographic camera of the type which is provided with a simple, flexible, reciprocating blade type shutter.

The camera includes a housing which has means for defining an exposure area at a focal plane in which a photographic film may be positioned for exposure.

Optical means are provided, including at least one optical lens element having an optical axis, mounted with the housing to establish an optical path between the lens element and the focal plane so that a real image of a photographic scene may be formed in the focal plane by the optical means. The optical lens element is movable along the optical axis to change the distance separating the lens element from the focal plane for purposes of changing the back focal length of the lens element in order to adjust the focus of the camera for different object distances.

Also included is a blade mechanism which includes at least one thin elongated, normally flat, flexible blade element having an aperture of predetermined size and location.

Means are provided for mounting the blade mechanism for movement generally transverse to the optical path of the camera between a first position wherein it blocks the optical path to preclude scene light from reaching the focal plane and a second position wherein at least a portion of the blade element's aperture unblocks the optical path to permit scene light to impinge upon the focal plane and for coupling the blade mechanism with the lens element and the camera housing so that the blade mechanism may be bowed from its normally flat configuration in response to the axial focusing displacement of the lens element. In this manner, the blade element's aperture is always axially spaced away from the lens element by substantially the same distance whenever the blade mechanism is in its second position while at least one of the blade element's end portions is restrained from movement with respect to the housing in a direction generally parallel with the optical axis.

Also provided are selectively actuable drive means for moving the blade mechanism between its first and second positions.

In the preferred embodiment of the invention the blade mechanism comprises a pair of thin, elongated, normally flat, flexible blade elements each of which has an aperture of predetermined size and location. The blade elements are mounted in an elongated, flat, flexible blade guide arranged transverse to the optical path. The flexible blade guide has longitudinal edge portions which are configured to receive the opposed longitudinal edges of the pair of blade elements to retain the blade elements in position transverse to the optical axis and provide a track for guiding the blade elements as they are moved relative to one another. Thus arranged, the blade elements are mounted for movement between a first position at which their apertures are misaligned with the optical axis to block the optical path of the camera and a second position at which the blade's apertures are at least partially aligned with the optical axis to unblock the optical path. The pair of blade elements and the blade guide being arranged in this manner bow simultaneously from their normally flat configuration in response to the axial displacement of the lens element during focusing.

The lens element of the preferred embodiment is a simple positive meniscus type lens which is mounted in a thin-walled hollow opaque cylinder having screw threads on its exterior surface that are adapted to be received in a complementary threaded hole located in the housing so that the lens element may be axially displaced with respect to the focal plane as the cylindrical lens mount is rotated in the housing.

Also in the preferred embodiment, the blade guide has a central aperture concentrically aligned with the optical axis and in alignment with a rear end of the cylindrical lens mount.

The preferred means for coupling the blade mechanism to the optical lens element and the camera housing comprises means for pinning the opposite ends of the elongated flexible blade guide to the housing for slidable and pivotal movement with respect to the housing and complementary configured means positioned adjacent the central aperture located in the blade guide and the rear end of the cylindrical lens mount so as to couple the central region of the blade guide to the rear end of the cylindrical lens mount so that the central region of the blade guide moves axially with the rear end of the cylindrical lens mount as the lens mount is rotated for focusing while the opposing pinned ends of the blade guide remain substantially stationary in a direction parallel with the optical axis while sliding transverse to the optical axis.

The preferred drive means comprises a stepper type motor which is fixedly mounted to the housing and includes portions which are always maintained in driving relationship with the pair of blades.

DESCRIPTION OF THE DRAWINGS

The novel features which are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

FIG. 1 is a perspective view, with parts broken away, of the camera of the invention;

FIG. 2 is a section of a portion of the camera shown in FIG. 1 taken along the lines 2—2 of FIG. 1.

DESCRIPTION OF THE PREFERRED EMBODIMENT

Figure 3:
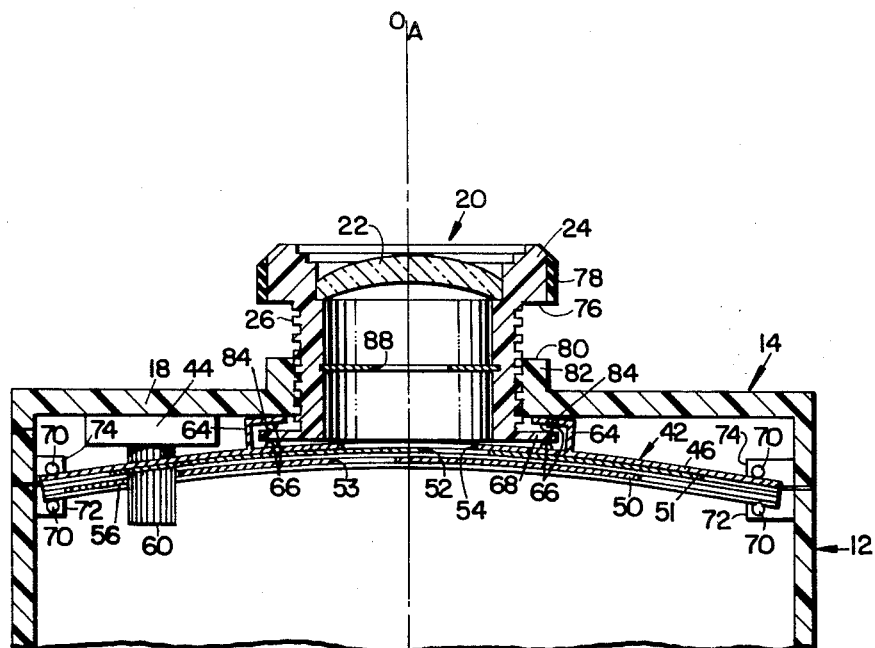
FIGS. 3, 4, and 5 are sections of a portion of the camera shown in FIG. 1 taken along lines 3—3 of FIG. 1 each figure illustrating a portion of the shutter of the camera of FIG. 1 in a different position.

Referring now to FIG. 1, there is shown a photographic camera 10 which is the preferred embodiment of the present invention. The camera 10 is preferably of the rigid body or box type camera and comprises a body 12, a front cover 14, and a door 16 which interconnect to define its outward appearance and serve as a protective enclosure for housing the camera's interior components. The body 12, the front cover 14, and the door 16 are preferably fabricated of an opaque plastic using injection molding techniques in order to simplify their manufacture and reduce cost.

Located in a vertical forward wall 18 of the front cover 14 is a photographic objective taking lens 20 having an optical axis, OA, therethrough. The objective taking lens 20 has a fixed focal length and comprises an aspheric meniscus positive lens element 22 (see FIG. 2) which is mounted in a generally cylindrical, thin-walled, opaque lens mount 24 having screw threads 26 on its exterior surface. The forward wall 18 has a threaded hole 28 that is adapted to receive the threads 26 of the cylindrical lens mount 24 so that the optical lens element 22 may be axially displaced along the optical axis, OA, by rotating the cylindrical lens mount 24. In this manner the back focal length of the objective taking lens 20 may be changed in order to effect focusing of the camera 10 for a range of different object distances. The objective taking lens 20 is preferably of the type described in considerable detail in U.S. Pat. No. 3,902,792 issued to William T. Plummer on Sept. 2, 1975 and entitled "Landscape Lens."

The body 12 (see FIG. 1) includes a bottom wall 30 and an interior wall 32 located in a horizontal plane spaced from the bottom wall 30 and generally parallel to it. Included in the interior wall 32 is an exposure aperture 34 the peripheral edges of which define an exposure area which is preferably dimensioned to be generally coextensive with the photosensitive area of the film to be used with the camera 10. The bottom wall 30 and the interior wall 32 cooperate to provide a film receiving chamber 36 in which a container of film units (not shown), such as a cassette or the like, may be positioned such that the photosensitive area of the film may be positioned in alignment with the exposure aperture 34 adjacent the bottom side of the interior wall 32. In this manner, the bottom wall 30 and the interior wall 32 provide the housing of the camera 10 with a means for defining an exposure area at a focal plane in which film may be positioned for exposure.

The body 12 also includes a generally planar rear wall 38 slanted at a predetermined angle with respect to the exposure aperture 34 and the optical axis, OA, of the objective taking lens 20. Attached to the rear wall 38 is a trapezoidal shaped mirror 40 positioned along the optical axis, OA, of the objective taking lens 20, intersecting it at a predetermined angle, to fold the optical axis of the objective taking lens 20 so as to establish a folded optical path between the objective taking lens 20 and the focal plane of the camera 10. With this optical arrangement, rays from a photographic scene which emerge from the objective taking lens 20 during an exposure cycle are reflected from the mirror 40 onto the focal plane of the camera 10. The exposure aperture 34 and the objective taking lens 20, thus arranged, cooperate to provide the camera 10 with a field of view which defines the area of the photographic scene that will be imaged on the focal plane bounded by the peripheral edges of the exposure aperture 34. It is to be understood that the optical path between the objective taking lens 20 and the exposure aperture 34 need not be folded as described but may be direct. However, the folded optical path allows for a more compact camera and also may be desirable in the case where the film requires an image reversal.

The objective taking lens 20 in combination with the mirror 40 thus provide the camera 10 with optical means, mounted with the housing of the camera 10 for establishing an optical path between the lens element 22 and the focal plane of the camera 10 so that a real image of a photographic scene may be formed in the focal plane of the camera 10. The arrangement for mounting the objective taking lens 20 in the forward wall 18 of the front cover 14 provides a means for allowing the optical lens element 22 to be moved along the optical axis, OA, to change the distance separating the lens element 22 from the focal plane of the camera 10 for purposes of facilitating focusing of the camera 10.

Means for blocking and unblocking the optical path of the camera 10 for exposure purposes are provided in the form of a flexible shutter blade assembly 42 (see FIG. 1) mounted transverse to the optical axis, OA, and driven by a stepper type motor 44 which is fixedly attached to the inner surface of the vertical forward wall 18 of the front cover 14.

The flexible shutter blade assembly 42 comprises an elongated flexible blade guide 46 having a pair of spaced apart track portions 48 which are arranged along its longitudinal edges. Mounted within the track portions 48 is a blade mechanism comprising a pair of thin elongated, normally flat, opaque, flexible blade elements 50 and 51. (See FIG. 4 for normally flat configuration.) The blade elements, 50 and 51, include, respectively, apertures 52 and 53 of predetermined size and location. The blade guide 46 and the blade elements, 50 and 51, are preferably fabricated of a suitable plastic material by injection molding.

Located near the center of the flexible blade guide 46 is an aperture 54 that is larger than either of the apertures, 52 and 53, of the blades 50 and 51. The aperture 54 is concentrically disposed with respect to the optical axis, OA, and is in alignment with the cylindrical lens mount 24 (see FIG. 4). The size of the aperture 54 is dimensioned to be the largest aperture along the optical path of the camera 10 so that it has no effect on the optical image quality of the photographic scene imaged in the focal plane of the camera 10 for reasons to be subsequently explained.

Each of the blades, 50 and 51, include rack extension segments 56 and 58, respectively, which are always in engagement with a pinion 60 mounted on the output shaft 62 of the stepper motor 44 (see FIG. 1). When the stepper motor 44 is turned on, its pinion 60 via the rack extension segments, 56 and 58, of the blades, 50 and 51, drive the blades, 50 and 51, in opposite directions in the blade guide 46. Depending upon the initial position of the blades, 50 and 51, and the sense of rotation of the pinion 60, the apertures, 52 and 53, of the blades, 50 and 51, may each be driven towards the optical axis, OA, or away from the optical axis, OA. As shown in FIG. 1, the blades, 50 and 51, are positioned with respect to one another so that their apertures, 52 and 53, are misaligned with the optical axis, OA, thereby precluding scene light from reaching the focal plane of the camera 10. When the blades, 50 and 51, are in this normally blocking position and the stepper motor 44 is turned on so that the pinion 60 rotates in a counterclockwise direction (in FIG. 1), the blades, 50 and 51, are driven in opposite directions such that their apertures, 52 and 53, overlap each other along the optical axis, OA, thereby unblocking the optical path of the camera 10 to permit scene light to impinge upon the focal plane of the camera 10. After some suitable interval corresponding to a predetermined exposure, the blades, 50 and 51, are driven in opposite directions to again block the optical path of the camera 10 by the stepper motor 44 which is then driven in a clockwise sense. Those skilled in the art will recognize that the thickness of the blades, 50 and 51, and the dimensions of the spaced apart track portions 48 of the flexible blade guide 46 should be chosen so that the blades freely slide within the track provided by the blade guide 46 while at the same time are maintained with their surfaces in face-to-face relationship to prevent inadvertent light leaks which may occur if the blades, 50 and 51, are spaced too far apart from one another.

The stepper motor 44 may be selectively actuated by well-known electronic control means to provide a predetermined exposure interval such as those described, for example, in U.S. Pat. No. 3,900,855 issued to John W. Stempeck on Aug. 19, 1975 and entitled "Exposure Control System and Method," U.S. Pat. No. 3,903,528 issued to Richard C. Kee on Sept. 2, 1975 and entitled "Exposure Control System for Photographic Apparatus," U.S. Pat. No. 3,945,025 issued to John W. Stempeck on Mar. 16, 1976 and entitled "Exposure Control System" and U.S. Pat. No. 3,882,522 issued to Irving Erlichman on May 6, 1975 and entitled "Non Cocking Springless Shutter Developing Two Parameter Exposure Regulation."

In the foregoing manner, means have been provided for mounting the blade mechanism for movement generally transverse to the optical path of the camera 10 between a first position at which the blade apertures, 52 and 53, are misaligned with the optical axis, OA, of the camera 10 to block its optical path and a second position at which the blade apertures, 52 and 53, are at least partially aligned with the optical axis, OA, to unblock the optical path of the camera 10 to permit scene light to impinge upon the focal plane.

The stepper motor 44, including its drive pinion 60 comprise selectively actuable drive means which are fixedly mounted to the housing of the camera 10 near one of the ends of the flexible blade assembly 42 with axis of the pinion 60 extending generally parallel with the optical axis, OA, of the camera 10. The pinion 60 and the rack extension segments, 56 and 58, are configured and arranged with respect to one another so that their meshed relationship is always maintained even when the flexible shutter blade assembly 42 is bowed as will be explained.

Means are provided in the camera 10 for coupling the flexible shutter blade assembly 42, including the flexible blades, 50 and 51, with the objective taking lens 20 and the housing of the camera 10 so that the blade mechanism can be bowed from its normally flat configuration (see FIGS. 2 and 4) in response to the axial focusing displacement of the objective taking lens 20. The apertures, 52 and 53, of respective blades, 50 and 51, can thus be axially spaced away from the positive lens element 22 by substantially the same distance whenever the blade mechanism is in its second position while both ends of the blade guide 46 are restrained from movement with respect to the housing of the camera 10 in a direction generally parallel with the optical axis, OA.

The means for coupling the blade guide 46 with the objective taking lens 20 comprise a pair of spaced apart brackets 64 (see FIGS. 3–5) each of which includes a pair of spaced apart hemispherical bosses 66. Located at the rear end of the cylindrical lens mount 24 is a circular flange 68, concentric with the optical axis, OA, which is trapped between the hemispherical bosses 66 and slides freely between the bosses 66 as the lens mount 24 is rotated in either a clockwise or counterclockwise direction to effect focusing of the objective taking lens 20.

Figure 4:
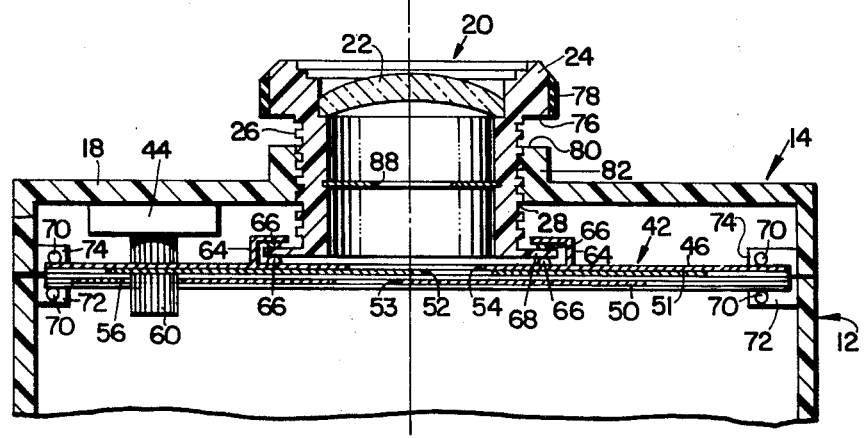
Figure 5:
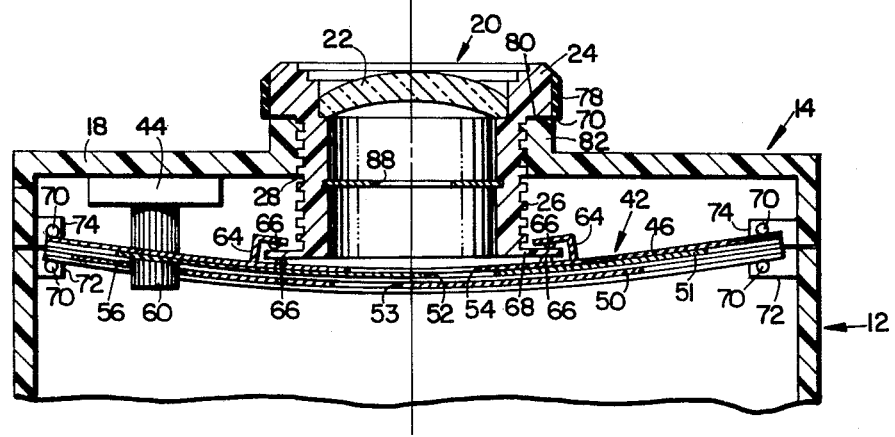

The means for coupling the flexible blade guide 46 to the housing of the camera 10 comprise four pairs of spaced apart pins 70, two pairs of which are located at each end of the flexible blade guide 46. Two pairs of pins 70 are formed respectively as extensions of two tab sections 72 located on the body 12. The other two pairs of pins 70 are formed respectively as extensions of sections 74 located on the front cover 14 (see FIGS. 1, 2, and 4). This arrangement permits the blade guide 46 to be placed against the pins 70 of the body 12 so that it may be trapped between those pins 70 and the pins 70 of the front cover 14 when the front cover 14 is assembled to the body 12 in any conventional manner. In this manner, the end portions of the elongated flexible shutter blade assembly 42 are restrained from movement in the direction generally parallel with the optical axis, OA, while being allowed to slide relative to the pins 70 in a direction transverse to the optical axis, OA, and also rotate with respect to each one of the pins 70. This arrangement permits the flexible shutter blade assembly 42 to be bowed toward and away from its normally flat position as illustrated in FIGS. 3 and 5 when the cylindrical lens mount 24 is rotated to adjust the focus of the camera 10. As can be seen in FIGS. 3, 4, and 5, the position of the apertures, 52 and 53, of respective blades, 50 and 51, are maintained in substantially the same spatial relationship with respect to the optical lens element 22 as the objective taking lens 20 is axially displaced between two extreme positions representing the focus for short object distances as illustrated in FIG. 3 and the focus for objects located at infinity as illustrated in FIG. 5.

The total amount of travel that the lens mount 24 experiences as it is focused for short distances and objects located at infinity is determined by two extreme stop positions. First, the infinity stop position, as illustrated in FIG. 5, occurs when a rear surface 76 of a bezel 78 of the cylindrical lens mount 24 butts up against a forward surface 80 of a cylindrical reinforced section 82 which surrounds the threaded hold 28 located in the vertical forward wall 18 of the front cover 14. The second extreme stop position, which is illustrated in FIG. 3, occurs when a forward surface 84 of the brackets 64 abutts the rear surface of the vertical forward wall 18 of the front cover 14. It will be noted with reference to FIGS. 3, 4, and 5 that, as the cylindrical lens mount 24 displaces between these two extreme stop positions, the pinion 60 of the stepper motor 44 is always in contact with the rack extension segments, 56 and 58, of respective blades, 50 and 51, thereby allowing the blades, 50 and 51, to be driven by the pinion 60 between the first and second positions of the blade mechanism even though the flexible shutter blade assembly 42 is bowed into one of its extreme configurations.

Those skilled in the art will recognize that the torque capability of the stepper motor 44 should be chosen to overcome any additional frictional effects introduced when the flexible shutter blade assembly 42 is in one of its bowed positions. When the flexible shutter blade assembly 42 is in one of its bowed positions, the torque requirements will be somewhat higher than the torque needed when the flexible shutter blade assembly 42 is in its normally flat configuration. Therefore, the torque capability of the stepper motor 44 should be sufficiently high enough to overcome any additional friction that may be introduced when the flexible shutter blade assembly 42 is in any bowed condition.

The axial spacing between the apertures, 52 and 53, of respective blades, 50 and 51, with respect to the positive lens element 22 is chosen so that the apertures, 52 and 53, operate to reduce the coma aberration of the lens element 22 whenever the blade mechanism is in its second position unblocking the optical path of the camera 10. As such, the apertures, 52 and 53, operate as an aperture stop for the objective taking lens 20 and it is therefore important that the axial spacing between the optical lens element 22 and the apertures, 52 and 53, when the blade mechanism is in its second unblocking position be maintained substantially constant throughout the axial displacement of the objective taking lens 20 as it is focused between its two extreme positions. Also included in the objective taking lens 20 is a vignetting stop 88 (see FIG. 2) for purposes of enhancing the optical imaging characteristics of the objective taking lens 20. The function of the vignetting stop 88 is discussed in more detail in U.S. Pat. No. 3,902,792 issued to William T. Plummer on Sept. 2, 1975 and entitled "Landscape Lens."

The axial separation between the positive lens element 22 and the apertures, 52 and 53, preferably correspond to the coma-free position of the positive meniscus lens element 22. Reference may be had to the Plummer patent for details regarding the size and location of the apertures, 52 and 53, as well as other detailed optical specifications. However, it will be recognized by those skilled in the art that the apertures, 52 and 53, need not operate as the aperture stop for the objective taking lens 20 of the camera 10 but may be replaced by a separate aperture which is fixedly mounted with respect to the cylindrical lens mount 24. In this instance the size of the apertures, 52 and 53, should be larger than the fixed aperture stop so that they do not interfere with the optical characteristics of the objective taking lens 20.

Certain other changes may be made in the above described embodiment without departing from the scope of the invention and those skilled in the art may make such changes according to the teachings of the disclosure. For example, other objective taking lenses having fixed focal lengths may be used in place of the one described. Therefore, it is intended that all matter contained in the above description or shown in the accompanying drawings shall be interpreted as illustrative and not in a limiting sense.

What is claimed is:

1. A photographic camera comprising:
a housing;
means within said housing for locating a film unit at an exposure position;
optical means, including at least one optical lens element having an optical axis, on said housing for forming a real image of a scene to be photographed on a film unit located at said exposure position;
actuable means for effecting the displacement of said lens element along its said optical axis for purposes of focusing said camera;
an aperture defining, flexible, elongated blade mechanism; and
means for mounting said blade mechanism for movement between a first arrangement wherein it blocks image carrying light rays from the scene being photographed from reaching the film unit and a second arrangement wherein it defines its said aperture through which such light rays may pass to effect exposure of the film unit, and for automatically flexing said blade mechanism responsive to the operation of said actuable means to maintain a substantially constant distance between said aperture defined by said blade mechanism and said displaceable lens element during all exposure operations of said camera regardless of variations in camera-to-scene distances between different exposure operations.

2. A photographic camera comprising:
a housing including means for defining an exposure area at a focal plane in which a photographic film may be positioned for exposure;
optical means, including at least one optical lens element having an optical axis, mounted with said housing for establishing an optical path between said lens element and said focal plane so that a real image of a photographic scene may be formed in said focal plane by said optical means, said optical lens element being movable along said optical axis to change the distance separating said lens element from said focal plane for purposes of facilitating focusing said camera;
a blade mechanism including at least one thin elongated, normally flat, flexible blade element having an aperture of predetermined size and location;
means for mounting said blade mechanism for movement generally transverse to said optical path between a first position wherein it blocks said optical path to preclude scene light from reaching said focal plane and a second position wherein at least a portion of said blade element's aperture unblocks said optical path to permit scene light to impinge upon said focal plane and for coupling said blade mechanism with said lens element and said housing so that said blade mechanism can be bowed from its normally flat configuration in response to the axial focusing displacement of said lens element such that said blade element's aperture is always axially spaced away from said lens element by substantially the same distance whenever said blade mechanism is in its said second position while at least one of said blade element's end portions is restrained from movement with respect to said housing in a direction generally parallel with said optical axis; and
selectively actuable drive means for moving said blade mechanism between its said first and second positions.

3. The camera of claim 2 wherein said selectively actuable drive means is fixedly mounted to said housing and includes portions which always remain in driving relationship with said blade mechanism even when said blade mechanism is bowed from its said normally flat configuration.

4. The camera of claim 2 wherein said selectively actuable drive means comprise a stepper type motor, having an output drive pinion, fixedly mounted to said housing near said restrained end of said blade element with said pinion extending generally parallel with said optical axis and wherein said blade element includes a rack extension portion coupled with said pinion in meshed relationship, said pinion and said rack extension portion being configured and arranged with respect to one another so that their meshed relationship is always maintained even when said blade mechanism is bowed from its said normally flat configuration.

5. The camera of claim 2 wherein said lens element of said optical means is a simple positive meniscus type lens and wherein said optical means includes an aperture stop spaced behind said meniscus lens along said optical axis at a predetermined position corresponding to the coma free location of said meniscus lens.

6. The camera of claim 2 wherein said lens element of said optical means is a simple positive meniscus type lens and wherein said blade element's aperture operates as an aperture stop for said meniscus lens when said blade mechanism is in its said second position, said distance by which said meniscus lens and said blade element's aperture are always axially separated when said blade mechanism is in its said second position corresponding to the coma free location of said meniscus lens.

7. The camera of claim 2 wherein said blade mechanism comprises a pair of thin, elongated, normally flat, flexible blade elements each of which has an aperture of predetermined size and location, said blade elements being mounted for movement between said first position at which said blade apertures are misaligned with said optical axis to block said optical path and said second position at which said blade apertures are at least partially misaligned with said optical axis to unblock said optical path.

8. The camera of claim 7 wherein said means for mounting said blade mechanism comprises an elongated, flat, flexible blade guide arranged transverse to said optical path and having longitudinal edge portions configured to receive the opposed longitudinal edges of said blade elements to retain said blade elements in position transverse to said optical axis and provide a track for guiding said blade elements as they are moved relative to one another, said blade elements and said blade guide being thus arranged to bow simultaneously from their normally flat configuration in response to the axial displacement of said lens element.

9. The camera of claim 8 wherein said flexible blade guide has a central aperture larger than either of said apertures of said blade elements, said central aperture of said blade guide being concentrically aligned with said optical axis of said lens element.

10. The camera of claim 8 wherein said moveable optical lens element is mounted in a thin-walled hollow opaque cylinder having screw threads on its exterior surface that are adapted to be received in a complementary threaded hole located in said housing such that said optical lens element may be axially displaced with respect to said focal plane as said cylindrical mount is rotated in said housing.

11. The camera of claim 10 wherein said blade guide has a central aperture concentrically aligned with said optical axis and in alignment with a rear end of said cylindrical lens mount and wherein said means for coupling said blade mechanism to said movable optical lens element and said housing comprises means for pinning the opposite ends of said elongated flexible blade guide to said housing for slidable and pivotal movement with respect to said housing and complementary configured means positioned adjacent said central aperture of said blade guide and said rear end of said cylindrical lens mount for coupling said central region of said blade guide to said rear end of said cylindrical lens mount so that said central region of said blade guide moves axially with said rear end of said cylindrical lens mount as said lens mount is rotated for focusing while said opposing pinned ends of said blade guide remain substantially stationary in a direction parallel with said optical axis while sliding transverse to said optical axis.

* * * * *